Nov. 24, 1953 R. BEAR 2,660,447
RIDING SULKY FOR POWER-OPERATED MOWING UNITS
Filed April 8, 1950 2 Sheets-Sheet 1

INVENTOR
BY Robert Bear
Stough & Stough
Attorneys

Nov. 24, 1953 R. BEAR 2,660,447
RIDING SULKY FOR POWER-OPERATED MOWING UNITS
Filed April 8, 1950 2 Sheets-Sheet 2
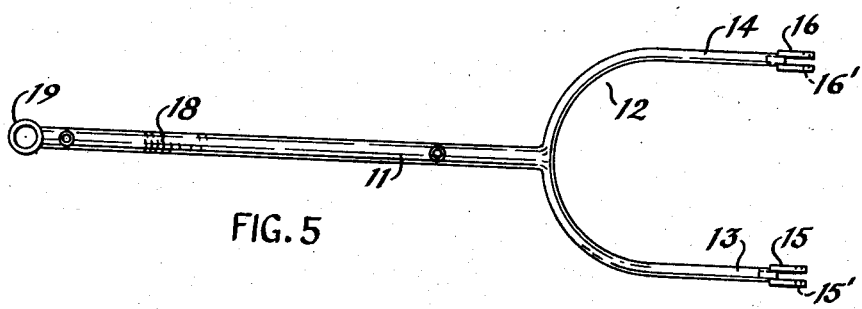
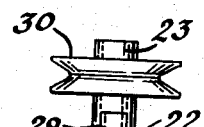
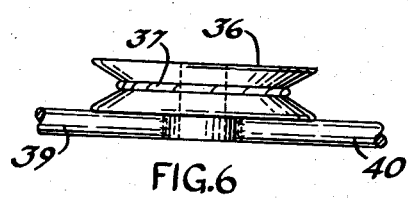
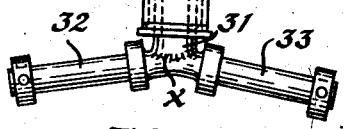
INVENTOR
Robert Bear
BY
Attorneys Patented Nov. 24, 1953

2,660,447

UNITED STATES PATENT OFFICE 2,660,447

RIDING SULKY FOR POWER-OPERATED MOWING UNITS

Robert Bear, Wellington, Ohio

Application April 8, 1950, Serial No. 154,827

2 Claims. (Cl. 280—87.1)

My invention relates to power operated mowing units and relates more particularly to a riding sulky adapted to be attached thereto upon which sulky the operator of the power unit may ride and control the motor operated unit.

It is an object of my invention to provide improved hitch means for joining a riding sulky of the type described and a power unit.

Another object of my invention is to provide an improved steering control for a two-wheeled power unit.

Another object of my invention is to provide an improved sulky operated control for mowing units wherein the operator may remain at the controls throughout mowing operations, including turning the unit.

Another object of my invention is to provide an improved operator controlled sulky for operating a wheeled power unit which will be composed of but few parts, being economical to manufacture and highly efficient in use.

Other objects of my invention and the invention itself will become more readily apparent from a purview of the attached drawings and the appended specification, in which drawings:

Fig. 5 is a top plan view of the hitch and sulky main frame of Fig. 1;

Fig. 6 is an enlarged view of the forwardly disposed pulley shown in Fig. 1;

Fig. 7 is an enlarged view of the saddle post and rear axle of the sulky;

Fig. 8 is a side view of the sulky, hitched to a forwardly disposed two-wheeled driving unit carrying ground-working tools forwardly thereof.

Figure 1:
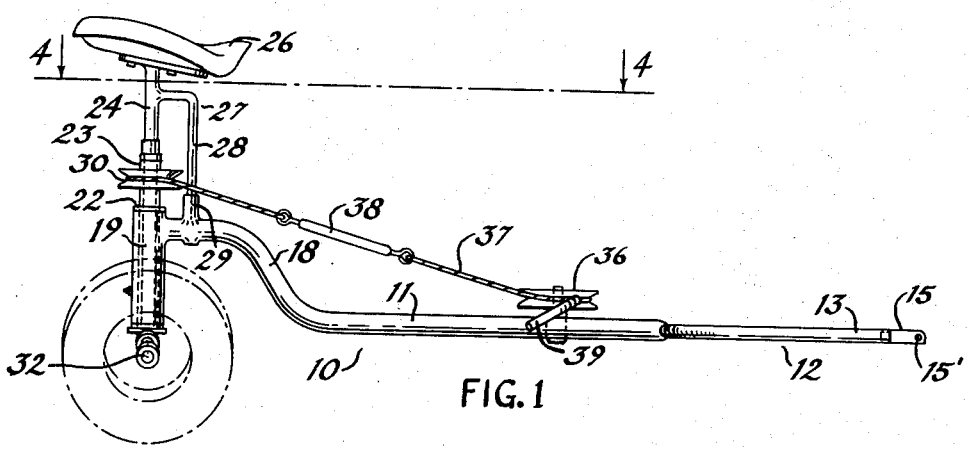
Fig. 1 is a side view of the sulky and hitch of my invention.

Referring now to the drawings, in all of which like parts are designated by like reference characters, in Fig. 1 at 10 I show a riding sulky adapted for use with a power motor operated mowing unit 20, as best shown in Fig. 8. The sulky 10 comprises a yoked draw-bar 11 having a U-shaped yoke 12, the arms 13 and 14 of which are provided with forked elements 15 and 16, respectively, each tine of each fork being provided with apertures 15' and 16', respectively, to accommodate coupling pins 17 (Fig. 8) which are used to secure the hitch to the power-operated mowing unit 20. A rear portion of the draw-bar 11 is inclined upwardly as best shown at 18 and is integrally welded or otherwise affixed to a metal sleeve 19 adapted to be rotatably secured in a vertical position by means of bushings 21 and 22 on the caster stem 23 into which a vertically disposed saddle post 24 is telescoped. The saddle frame 25 is rigidly secured and preferably downwardly inclined from the uppermost end of the saddle post 24 and is adapted to carry the saddle 26 illustrated in Figs. 1, 2 and 8.

The post 24 is provided with an auxiliary post member 27 which extends at right angles from the main post 24 and is then bent downwardly having a vertically disposed portion 28 disposed parallel to said main post, the lowermost end of the portion 28 being disposed within an upwardly projecting tubular projection 29 integrally formed in the draw-bar adjacent its rearmost end. A pulley 30 is telescoped over the uppermost end of the caster stem 23 and is rigidly secured thereto.

Figure 2:
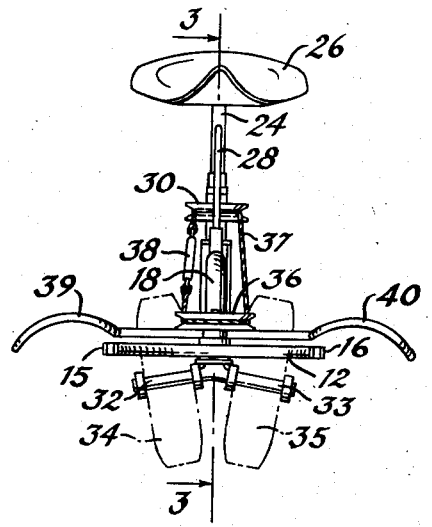
Fig. 2 is a front view of the sulky and hitch of Fig. 1.
Figure 3:
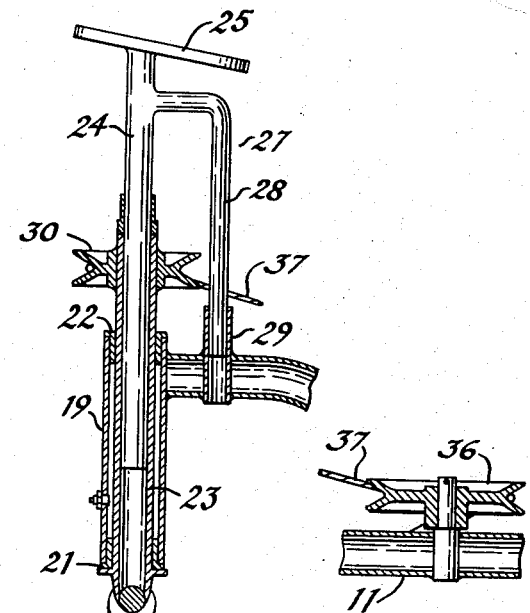
Fig. 3 is a sectional view taken on the line 3—3 of Fig. 2, the view being broken to more clearly illustrate the parts and the parts being enlarged for greater clarification.
Figure 4:
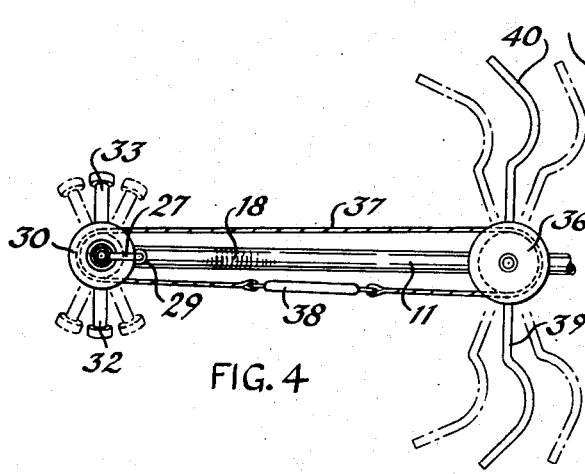
Fig. 4 is a view taken on the line 4—4 of Fig. 1, dotted lines illustrating various operative positions of the parts.

The lowermost end 31 of the caster stem 23 is preferably welded as shown at X, Fig. 7, to axles 32 and 33. Upon the axles 32 and 33 at either end thereof, a pair of wheels 34 and 35 are disposed and as best shown in Fig. 2, said pair of wheels are cambered, being disposed downwardly converging, acting, in effect, as a single wheel, the operative effect being approximately that of a single wheel mounting for the sulky but giving added stability and control for the operator mounted sulky.

Adjacent the yoked end of the draw-bar 11, a second pulley 36 is journalled on the draw-bar 11, an endless cable 37 having a turn-buckle connection 38 joining the ends thereof together being disposed about the two pulleys, the pulley 36 being rotated by movement imparted to it by pressure on pedal bars 39 and 40 secured to the mounting for said pulley 36. Steering is thus controlled by the pedals 39 and 40 to laterally swing the sulky wheels 34 and 35, the seat 26 remaining in fixed position during swinging of the wheels due to the anchoring effect of the rod 27 which anchors the seat post 24 to the draw-bar 11, the post 24 of the seat being loosely journalled in the caster stem 23.

Hence, it will be obvious that even abrupt turns may be made to effect the steering by turning the sulky wheel to the right or left as required and in the manner indicated.

Steering handles such as shown at 50 in Fig. 8 are grasped to steady the position of the operator during operation of the sulky controlled mowing powered unit and lever controls 51 and 52 disposed substantially forwardly of the handle 50 may be provided for controlling the gear shift, clutch, etc.

I am aware that numerous and extensive departures may be made from the embodiment herein illustrated and described without, however, departing from the spirit of my invention or the scope of the appended claims.

I claim:

1. For use in power operated mowing units having control levers mounted thereon, a riding sulky comprising a draw-bar member, said draw-bar member consisting of a rearwardly extending bar portion and a forwardly disposed yoke portion, a vertically upwardly extending saddle post, a saddle supported upon said post, a tubular vertically upwardly extending caster stem, said post being telescoped within said caster stem, said post being provided with means adapted to be secured to said bar portion, said caster stem being rotatably secured to the rearmost end of said draw-bar portion, the lowermost end of said caster stem being integrally secured to a pair of axles which axles each support a cambered wheel, the yoke portion of the draw-bar member being adapted to be secured to the said power operated mowing unit, a first pulley mounted forwardly on the draw-bar portion, a second pulley mounted upon the said caster stem, an endless cable surrounding said pulleys, pedal means secured to the said first pulley, said pedal means controlling the direction of the cambered sulky wheels.

2. For use in power operated mowing units having control levers mounted thereon, a riding sulky comprising a draw-bar member, said draw-bar member consisting of a rearwardly extending bar portion and a forwardly disposed yoke portion, a vertically upwardly extending saddle post, a saddle supported upon said post, a tubular vertically upwardly extending caster stem, said post having a portion thereof telescoped within said caster stem, said caster stem being rotatably secured to the rearmost end of said draw-bar portion, the lowermost end of said caster stem being integrally secured to a pair of axles which axles each support a cambered wheel, the yoke portion of the draw-bar member being adapted to be secured to the said power operated mowing unit, a first pulley mounted forwardly on the draw-bar portion, a second pulley integrally secured to and mounted upon the caster stem, an endless cable surrounding said pulleys, pedal means secured to the first pulley, said pedal means controlling the direction of the sulky cambered wheels, means integrally secured to the saddle post projecting forwardly thereof to engage within a tubular projection formed in the draw-bar adjacent its rearmost end, the post remaining in a fixed position during lateral movement of the wheels.

ROBERT BEAR.

References Cited in the file of this patent

UNITED STATES PATENTS

| Number | Name | Date |
|---|---|---|
| 879,864 | Gordon | Feb. 25, 1908 |
| 1,616,295 | Yourtee | Feb. 1, 1927 |
| 2,192,468 | Gore | Mar. 5, 1940 |
| 2,218,064 | Amsbury | Oct. 15, 1940 |
| 2,530,041 | Bennett | Nov. 14, 1950 |